(12) United States Patent
Li et al.

(10) Patent No.: US 7,007,141 B2
(45) Date of Patent: Feb. 28, 2006

(54) ARCHIVAL DATA STORAGE SYSTEM AND METHOD

(75) Inventors: Kai Li, Princeton, NJ (US); Howard Lee, Princeton, NJ (US)

(73) Assignee: Data Domain, Inc., Menlo Park, CA (US)

( * ) Notice: Subject to any disclaimer, the term of this patent is extended or adjusted under 35 U.S.C. 154(b) by 620 days.

(21) Appl. No.: 10/061,081

(22) Filed: Jan. 29, 2002

(65) Prior Publication Data

US 2002/0144057 A1    Oct. 3, 2002

Related U.S. Application Data

(60) Provisional application No. 60/265,180, filed on Jan. 30, 2001.

(51) Int. Cl.
*G06F 12/16* (2006.01)

(52) U.S. Cl. .......................... 711/162; 711/161; 714/5; 714/6; 714/7; 714/8

(58) Field of Classification Search ................ 711/4, 711/111, 112, 114, 147, 148, 161, 162; 709/211, 709/208, 213, 214, 223; 714/5, 6, 7, 8; 713/324, 713/320, 300; 712/31; 378/62
See application file for complete search history.

(56) References Cited

U.S. PATENT DOCUMENTS

| | | | |
|---|---|---|---|
| 3,689,891 A * | 9/1972 | Russell ...................... 711/112 |
| 4,084,231 A | 4/1978 | Capozzi et al. |
| 4,145,739 A | 3/1979 | Dunning et al. |
| 4,532,802 A | 8/1985 | Yeack-Scranton et al. |
| 4,933,785 A | 6/1990 | Morehouse et al. |
| 4,980,896 A | 12/1990 | Forsyth et al. |
| 4,987,502 A | 1/1991 | Freeze |
| 5,124,987 A * | 6/1992 | Milligan et al. ................ 714/7 |
| 5,134,602 A * | 7/1992 | Baca et al. .............. 369/44.27 |
| 5,155,835 A * | 10/1992 | Belsan ........................ 711/114 |
| 5,197,055 A * | 3/1993 | Hartung et al. .......... 369/30.32 |
| 5,210,866 A * | 5/1993 | Milligan et al. ................ 714/6 |
| 5,345,347 A | 9/1994 | Hopkins et al. |
| 5,402,200 A | 3/1995 | Shrinkle et al. |
| 5,423,046 A | 6/1995 | Nunnelley et al. |
| 5,442,608 A | 8/1995 | Umeda et al. |
| 5,452,277 A | 9/1995 | Bajorek et al. |
| 5,469,553 A | 11/1995 | Patrick |

(Continued)

Primary Examiner—B. James Peikari
(74) Attorney, Agent, or Firm—Beyer Weaver & Thomas, LLP (57) ABSTRACT

A disk-based archival storage system including a storage unit configured to store archival data, the storage unit including at least one spindle of disks configured to magnetically store archival data, an interconnect; and a control unit configured to process requests over the interconnect to either archive to or retrieve data from the storage unit. In one embodiment, the system includes a plurality of the storage units, each including at least one spindle of disks. The control unit controls the storage unit(s) in a master-slave relationship. Specifically the control unit is capable of issuing commands to selectively cause the storage unit(s) to shut down or power up, enter a running mode or a standby mode, cause the spindle of disk(s) to either spin up or spin down, and to perform a data integrity check of all the archival data stored in the storage system. In various other embodiments, the control unit runs algorithms that expand the lifetime and longevity of the disk spindles, optimizes power consumption, and performs data migration in the event a data integrity check identifies correctable errors.

50 Claims, 5 Drawing Sheets

U.S. PATENT DOCUMENTS

| | | | |
|---|---|---|---|
| 5,481,733 A | 1/1996 | Douglis et al. | |
| 5,493,670 A | 2/1996 | Douglis et al. | |
| 5,517,649 A | 5/1996 | McLean | |
| 5,682,273 A | 10/1997 | Hetzler | |
| 5,745,458 A * | 4/1998 | Oliver et al. | 369/53.28 |
| 5,774,292 A | 6/1998 | Georgiou et al. | |
| 5,784,610 A * | 7/1998 | Copeland et al. | 707/10 |
| 5,821,924 A | 10/1998 | Kikinis et al. | |
| 5,870,264 A | 2/1999 | Restle | |
| 5,900,007 A | 5/1999 | Nunnelley et al. | |
| 5,954,820 A | 9/1999 | Hetzler | |
| 5,961,613 A | 10/1999 | DeNicola | |
| 6,115,509 A * | 9/2000 | Yeskel | 382/309 |
| 6,430,005 B1 * | 8/2002 | Romig | 360/133 |
| 6,470,071 B1 * | 10/2002 | Baertsch et al. | 378/62 |
| 6,600,703 B1 * | 7/2003 | Emberty et al. | 369/30.83 |
| 6,732,125 B1 * | 5/2004 | Autrey et al. | 707/204 |

* cited by examiner

ARCHIVAL DATA STORAGE SYSTEM AND METHOD

This application claims priority of U.S. provisional patent application No. 60/265,180, filed Jan. 30, 2001 and entitled "System Architecture and Methods of Building Low-Power, Dynamically Reconfigurable, And Reliable Online Archival System," which is hereby incorporated by reference for all purposes.

FIELD OF THE INVENTION

The present invention relates generally to data storage, and more specifically, to an online archival disk-based data storage system with algorithms for reducing power consumption, improving disk longevity and reliability, and maintaining data integrity.

BACKGROUND OF THE INVENTION

With the increasing popularity of Internet commerce and network centric computing, businesses and other entities are becoming more and more reliant on information. Protecting critical data from loss due to human errors, software errors, system crashes, virus attack and the like is therefore of primary importance. Data archival systems are typically used in information systems to restore information in the event of a failure or error. Tape drives and/or write-able CD drives have historically been the storage medium of choice for data archival systems. Magnetic disk based archival storage systems have generally not been considered for long term storage because the lifetime of disks is relatively short and their power consumption is high compared to magnetic tape or write-able CDs.

Magnetic disks are typically used as primary storage for information infrastructures and as storage drives in personal computers, laptop computers, servers, and the like. A number of power saving techniques have been proposed for laptop computers. Software controlled power saving modes have been used to control power consumption during periods of inactivity. Adaptive algorithms which analyze access patterns to adaptively determine when to spin disks up or down to reduce power consumption. Such algorithms, however, usually focus on reducing the power consumption of laptop computers whose disks are specifically designed to spin up and spin down more times than required during the typical life expectancy of a laptop computer. Disks for desktops or servers are usually engineered to handle a limited number of starts and stops. Applying the same power conservation methods used with laptop computers to disk-based archival systems would shorten disk lifetime. Furthermore, these power saving techniques do not address the problem of checking or maintaining the integrity of data stored on disks for extended periods of time.

An archival disk-based data storage system that reduces power consumption, improves disk longevity and reliability, and maintains data integrity for extended periods of time is therefore needed.

SUMMARY OF THE INVENTION

To achieve the foregoing, and in accordance with the purpose of the present invention, a disk-based archival storage system is disclosed. The system according to one embodiment includes a storage unit configured to store archival data, the storage unit including at least one spindle of disks configured to magnetically store archival data, an interconnect, and a control unit configured to process requests over the interconnect to either archive or retrieve data from the storage unit. In one embodiment, the system includes a plurality of the storage units, each including at least one spindle of disks. The control unit controls the storage unit(s) in a master-slave relationship. Specifically the control unit is capable of issuing commands to selectively cause the storage unit(s) to shut down or power up, enter a running mode or a standby mode, cause the spindle of disk(s) to either spin up or spin down, and to perform a data integrity check of all the archival data stored in the storage system. In various other embodiments, the control unit runs algorithms that expand the lifetime and longevity of the disk spindles, optimize power consumption, and perform data migration in the event a data integrity check identifies correctable errors. Hence for the first time, the present invention provides a disk-based storage system that practically can be used for data archival purposes.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Figure 1:
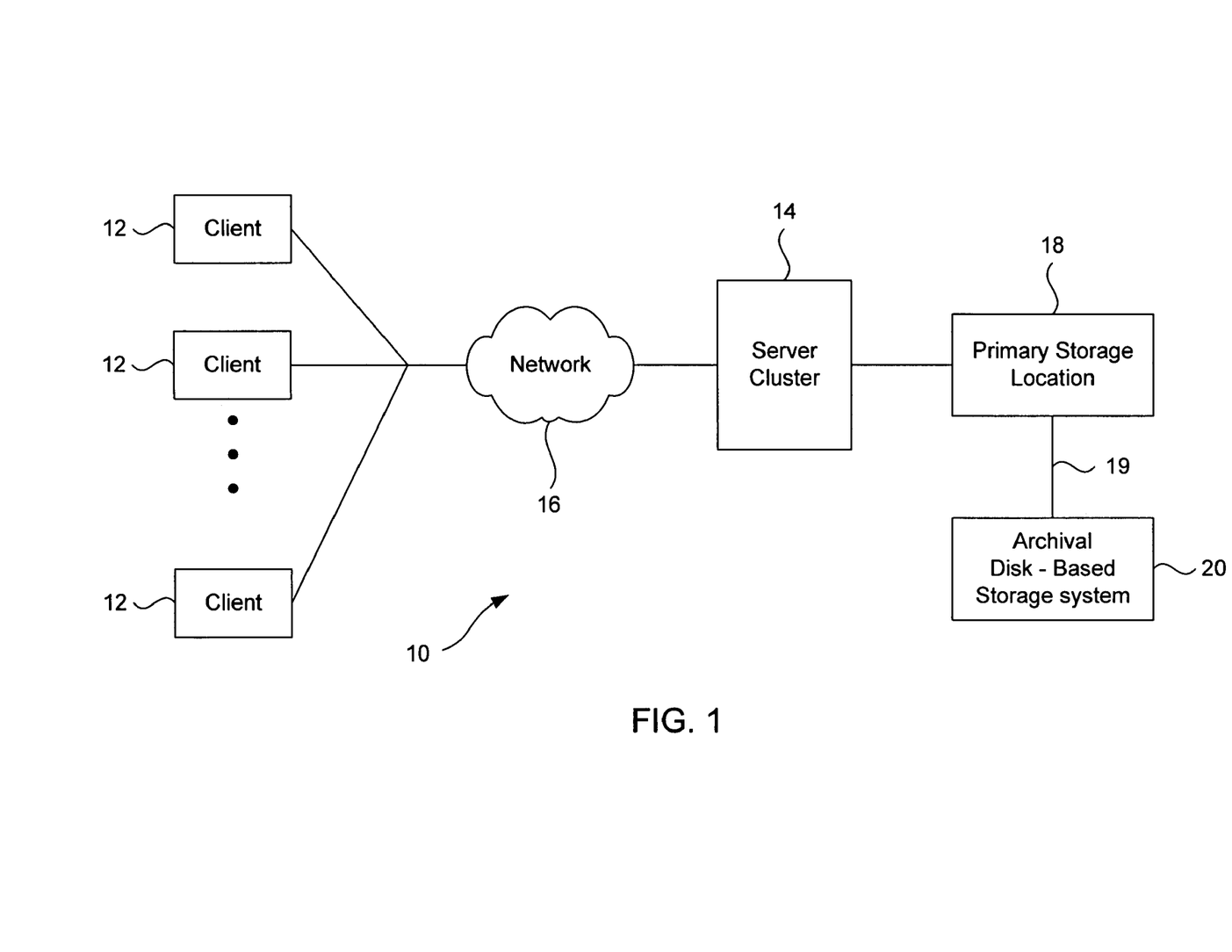
FIG. 1 is a diagram of an exemplary information infrastructure in which the archival disk-based data storage system (hereafter storage system) of the present invention may be used.

Referring to FIG. 1, a diagram of an exemplary information infrastructure in which the archival disk-based data storage system of the present invention may be used is shown. The information infrastructure 10 includes a plurality of clients 12 and a server cluster 14 including one or more servers coupled together by a network 16, a primary storage location 18, the archival disk-based data storage system (hereafter "storage system") 20, and a network connection 19 coupling the primary storage location 18 and the storage system 20. The clients 12 can be any type of client such as but not limited to a personal computer, a "thin" client, a personal digital assistant, a web enabled appliance, or a web enabled cell phone. The server(s) of server cluster 14 may include any type of server(s) configured as either a file server, a database server, or a combination thereof. Likewise, the network 16 can be any type of network. The primary storage location may be configured in any number of different arrangements, such as a storage array network, network attached storage, or a combination thereof. The primary storage location 18 may be either separate or part of the server cluster 14. The network connection 19 can be any type of network connection, such as fiber channel, Ethernet, or SCSI.

Figure 2:
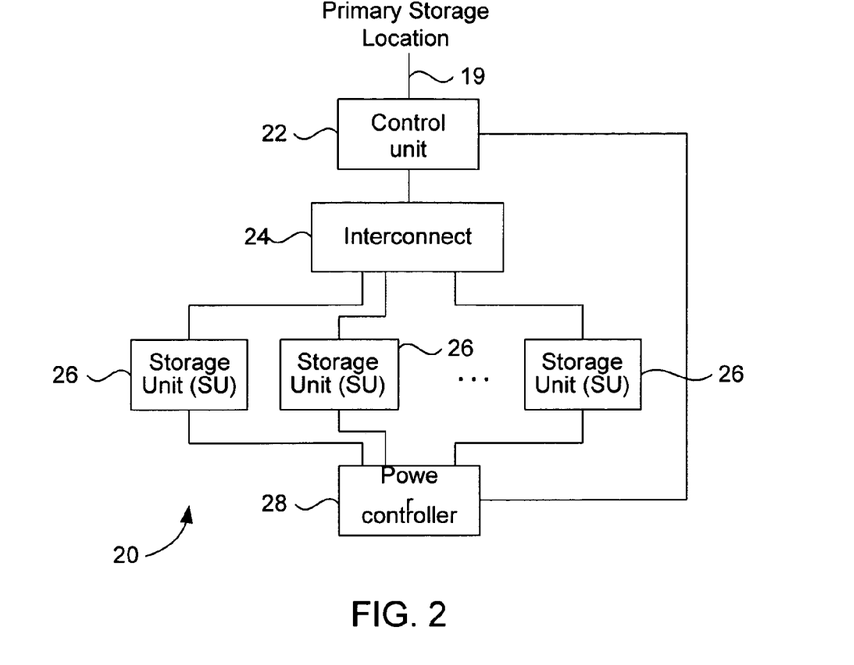
FIG. 2 is a system diagram of the storage system of the present invention.

Referring to FIG. 2, a system diagram of the storage system 20 is shown. The storage system 20 includes a control unit 22, an interconnect 24, a plurality of storage units (SUs) 26, and a power controller 28. The control unit 22 is a standard computer such as a personal computer that interfaces with primary storage location 18 over network 19. The control unit 22 also operates as a master with respect to the storage units 26 and sends tasks to the storage units 26, receives results from the storage units 26, and controls the working modes of storage units 26. The interconnect 24 can be either a custom-designed interconnect or a standard local area network capable of transmitting special commands or packets to the storage units 26.

Figure 3:
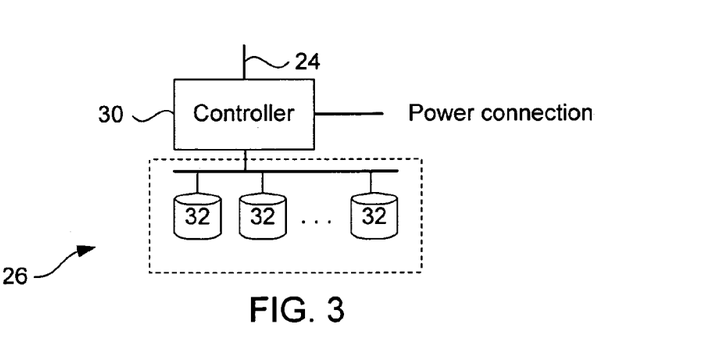
FIG. 3 is a system diagram of a storage unit provided in the storage system of the present invention.

Referring to FIG. 3, a system diagram of a storage unit 26 is shown. Each storage unit 26 includes a controller 30 and one or more spindles of magnetic disks 32. The storage unit 26 are slaves with respect to the control unit 22. By responding to the commands of the control unit 22, the controller 30 executes software that directs the storage unit 26 to shutdown or power up, change its modes between running and standby (sleep mode), and either spin up or down some or all of the magnetic disks 32. The control unit 22 also commands the controller 30 to periodically perform data integrity checks of the data stored on its disks 32. According to various embodiments of the invention, the magnetic disks 32 may assume a number of different configurations such as a Redundant Array of Independent Disks (RAID) or as individual disks in either a logical or physical arrangement.

Figure 4:
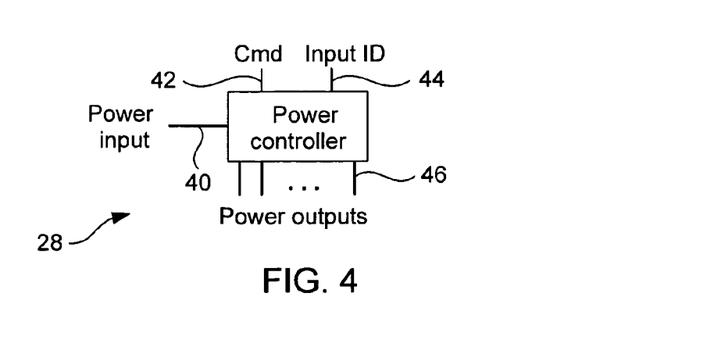
FIG. 4 is a system diagram of a power controller provided in the storage system of the present invention.

Referring to FIG. 4, a system diagram of the power controller 28 is shown. The power controller includes a power input 40 for receiving power, a command input 42 for receiving an on/off command from the control unit 22, an Input ID 44 for receiving an identity number input corresponding to one of the storage units 26, and a number of power outputs 46 coupled to the storage units 26 respectively. In response to an on/off command and an identity number received from the control unit 22 at inputs 42 and 44, the power controller 28 can selectively provide power from input 40 to the storage units 26 through power outputs 46 respectively.

The control unit 22 is responsible for moving archived and retrieved data between the primary storage location 18 and the storage units 26. The control unit 22 maintains a directory of all the archived data stored in the storage system 20. The directory includes a map of the data blocks for each of the storage units 26 in the system 20. Each time data is either archived or retrieved, the accessed data block(s) and storage unit(s) 26 are updated in the directory. The control unit 22 also includes management software that controls the physical operation of the storage units 26 and the power controller 28. For example, the control unit 22 under the direction of the management software issues commands to determine which storage units 26 should be used, how long each storage unit 26 should run, and when a storage unit 26 should do a data integrity check. Power on/off commands along with an identify number are sent to the inputs 42 and 44 of power controller 28. Commands and/or packets are sent over the interconnect 24 by the control unit 22 to instruct an individual storage unit 26 to perform the requested task. In response, the controller 30 of the individual storage unit 26 executes software to perform the task.

An objective of the management software in control unit 22 is to maximize the lifetime of the storage units 26 and minimize their power consumption while providing a desirable response time. Keeping the storage units 26 running all the time provides the best response time, but will consume the maximum amount of power and shorten the lifetime of disks 32. Simply turning off the storage units 26 immediately after each request and turning them on for each request is also a poor solution in terms of response time, lifetime of disks 32, and power consumption. This scenario provides the worst response time because the storage units 26 will be turned off as soon as the current archival or retrieval job is complete. The lifetime of the disks 32 will be shortened because most disks other than those used for laptops are engineered to handle only a limited number of starts and stops (typically less than 50,000). Power consumption is not necessarily reduced because it takes much more power to spin up a disk than to perform normal operations. Therefore, a strategy that optimizes disk lifetime, minimizes power consumption and provides desirable response times, requires the advanced knowledge of request arrival times. Since it is impossible to know when future requests are going to occur, the best one can do is to derive an optimal off line strategy after the fact.

The present invention is a competitive algorithm implemented in the management software on the control unit 22. The results of using this algorithm guarantees performance to be within a factor of two of the optimal offline case. H is the amount of time a storage unit 26 runs while waiting for another request before powering-off or entering standby. In other words, H is set to the duration of time where the life cost and power cost of an idle spinning disk approximately equals the life cost and power cost of a disk spin up and spin down cycle. The following equation (1) can therefore be used to define the value of H:

$$H = \left(\frac{C_{SU}}{N} + C_W \times W_{Up} \times T_{Up}\right) \bigg/ \left(\frac{C_{SU}}{L} + C_W \times W_{RW}\right) \quad (1)$$

where:
$C_{SU}$: the cost of the storage unit
$C_W$: the cost per watt
L: the spin lifetime
N: the total number of start-and-stops
$T_{Up}$: the time taken to spin up
$W_{RW}$: the number of watts consumed for read or write operations, and
$W_{Up}$: the number of watts consumed for a spin up.

Among these parameters, L and N are variable parameters that are initialized to the spin lifetime and start-and-stop limit as defined by the disk manufacturer. These values will decrease over time as the disks consume their spin lifetime and start-and-stop limits.

As noted an objective of the disk-based archival storage system 20 is to extend the lifetime of its disks. Each disk typically has a practical spin lifetime of three to five years.

The error rate of a disk typically starts to increase significantly when the actual run time exceeds the spin lifetime of the disk. An important consideration therefore is to keep track of the remaining spin lifetime of a disk or a set of disks and to use this information to determine when to spin a disk down to extend its lifetime. A simple algorithm to extend disk lifetime is to spin down the disk as soon as a request is complete. Such an algorithm will preserve the remaining spin lifetime, but will typically provide an unacceptable response time following the next request. An improved algorithm that would generally provide better response times is to spin the disk for a small amount of time after each request. Since requests often have temporal locality, this algorithm seeks to improve response times at the expense of spin lifetime. Furthermore when a disk exceeds the start-and-stop limit, its error rate will typically increase significantly. Disks for desktops or servers usually have a limit of less than 50,000 start-and-stop times. To extend this lifetime, the start-and-stop limit of a disk should also be considered.

As is described in detail below, the present invention provides an algorithm that provides both excellent response times as well as helps extend the run time and the start and stop limit of the disks. With the algorithm of the present invention, a disk is kept spinning after each request for the amount of time equal to the lifetime of a start and stop. Since the remaining spin lifetime and the remaining start-and-stop limit change over time, the spin time needs to be recalculated after the completion of each request. In addition to lifetime, the algorithms of the present invention have the added benefit of reducing power consumption within an archival storage system 20.

Figure 5A:
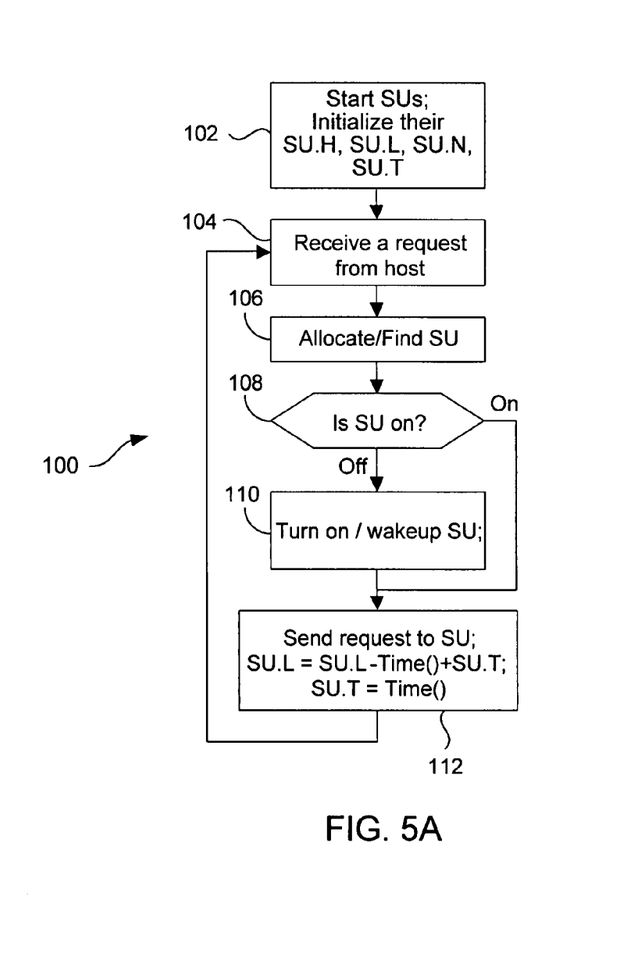
FIG. 5a is a flow diagram illustrating how the control unit of the archival disk-based data storage system manages the storage units with a competitive algorithm to process requests according to the present invention.

Referring to FIG. 5A, a flow diagram 100 illustrating how the control unit 22 manages the storage units 26 with a competitive algorithm to process requests according to one embodiment of the invention is shown. For each storage unit (SU) 26, the control unit 22 maintains several parameters including the current threshold value of H, the remaining-spin-lifetime L, remaining number of start-and-stops N, and the time-stamp of the last-request T (step 102). When the control unit 22 receives either an archival or retrieval request (step 104), it first allocates a storage unit 26 for an archival request or finds the appropriate storage unit 26 for a retrieval request using the directory of all the archived data stored in the storage system 20 (step 106). Thereafter the control unit 22 determines if the storage unit 26 is on (diamond 108). If the storage unit 26 is off or in standby mode (diamond 110), the control unit 22 issues commands to either power on or wake up the storage unit 26 (step 110). When the storage unit 26 is ready, the request will be sent (step 112) to that storage unit 26. If the storage unit 26 is already on (diamond 108), the request is sent immediately to that storage unit 26 (step 112). After the request is processes by the storage unit 26, it is reset and the values of SU.L and SU.T are all updated. SU.L or the remaining spin lifetime is calculated from the equation SU.L=SU.L−Time ( )+SU.T where SU.L is the previous spin lifetime value, and Time ( ) SU.T is the elapsed time since the previous request. SU.T is the time stamp of the current request. When another request occurs, control is returned back to step 104.

Figure 5B:
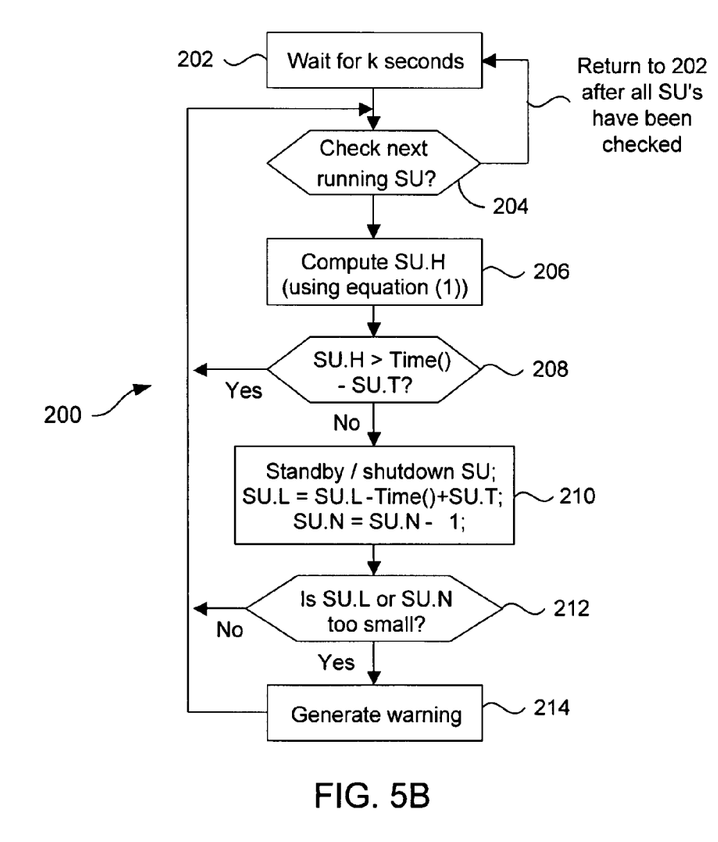
FIG. 5b is a flow diagram illustrating how the control unit of the storage system manages the storage units with a competitive algorithm to optimize disk lifetime and power consumption according to the present invention.

Referring to FIG. 5B, a flow diagram 200 illustrating how the control unit 22 manages the storage units 26 with a constant competitive algorithm to optimize disk lifetime and power consumption according to one embodiment of the invention is shown. The control unit 22 checks the status of all the running storage units 26 every k seconds (step 202). During this check, the control unit 22 sequences through storage units 26, one at a time, and identifies which are running (step 204). For each running storage unit 26, the control unit 22 computes an individual threshold SU.H using equation (1) as defined above (step 206). The control unit 22 then checks to determine if the threshold SU. H for each running storage unit 26 is greater than the elapsed time since the previous request Time( )−SU.T (step 208 ). If yes, control is returned to step 204. If the running time SU.T has exceeded the threshold SU.H, the control unit 22 will turn off that storage unit 26 or issue a command to place it in standby mode. The values for SU.L and SU.N are also updated (step 210). The remaining spin lifetime SU.L is calculated as described above. The number of remaining start-and-stops SU.N is calculated by decrementing the previous value of SU.N by one. Finally, in decision diamond 212, it is determined if the remaining lifetime SU.L and the remaining number of stall and stops SU.N are too small as determined by the manufacturer of the disks 32. If no, control is returned to step 204. If yes with either parameter, a warning is generated (step 214) indicating that the storage unit 26 or at least the disks 32 should be replaced. After all the storage units have been checked, control is returned to box 202 and K seconds elapses before the above steps are repeated.

Figure 6A:
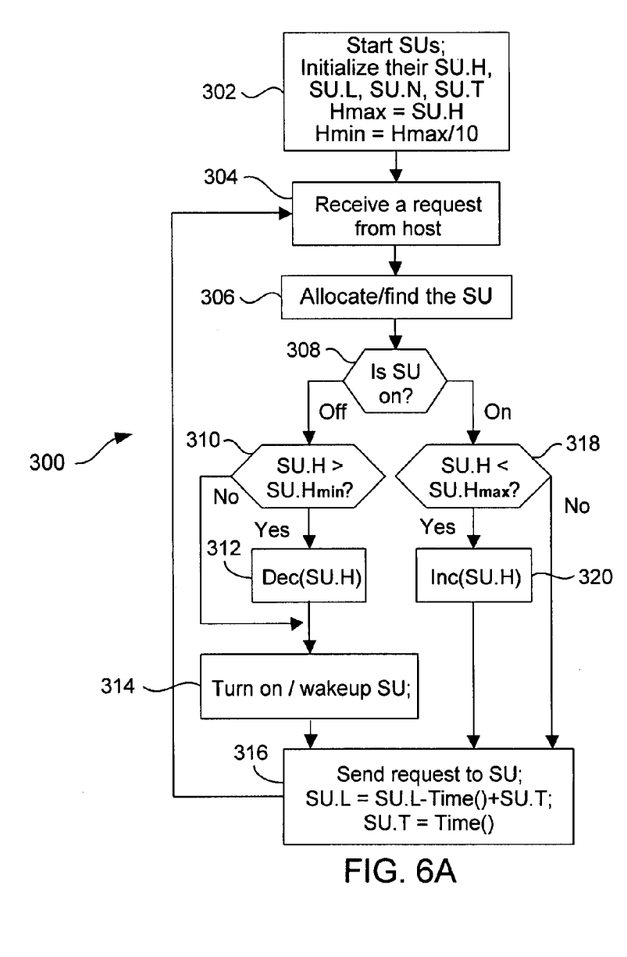
FIG. 6a is a flow diagram illustrating how the control unit of the storage system manages the storage units with an adaptive competitive algorithm to process requests according to the present invention.

Referring to FIG. 6A, a flow diagram 300 illustrating how the control unit 22 may manage the storage units 26 with an adaptive competitive algorithm to process requests according to another embodiment of the present invention is shown. With this embodiment, an adaptive algorithm is used that dynamically adjusts the value of H for each storage unit 26 based on the frequency and timing of requests. The adaptive algorithm is based on the assumption that there is a high probability that the wait time for the next request will exceed the time equivalent of a spin up and down cycle if the previous wait time for a request also exceeded the spin up and down cycle time. In situations where request arrivals tend to have temporal locality, this algorithm will achieve better results than the previous competitive algorithm.

The flow chart 300 is similar to flow chart 100 of FIG. 5a. Steps 302–308 are identical to those of steps 102–108 of FIG. 5a respectively and therefore are not described in detail herein. The main difference between the two flow charts 100 and 300 involves the use of a threshold Hmin and threshold Hmax to store the low and high thresholds for each storage unit 26. These values are initialized in step 302 so that Hmax=SU.H and Hmin=Mmax/10. At decision diamond 308, if the storage unit 26 to be access (in response to an archival or retrieval request) is off, then the current value of SU.H for that storage unit 26 is compared to Hmin (step 310). If the current value of SU.H is greater than Hmin, then the current value is decremented (step 312) before the storage unit 26 is turned on or woken up (step 314). If the current value of SU.H is less than Hmin, then the current value is not decremented and the storage unit 26 is turned on or woken up (step 314). Thereafter the request is sent to the storage unit 26 (step 316). On the other hand, if the storage unit 26 is on, then the current value of SU.H is compared to Hmax (step 318). If the current value is less than Hmax, the current value is incremented (step 320) and then the request is sent to the storage unit 26. Otherwise the request is sent directly to the storage unit 26 (step 316). After the request is received by the storage unit 26, the values of SU.L and SU.T are updated in a similar manner as described above (step 316). SU.H is adjusted between Hmax and Hmin in order to guarantee that the performance is within a factor of two of the optimal offline case.

Figure 6B:
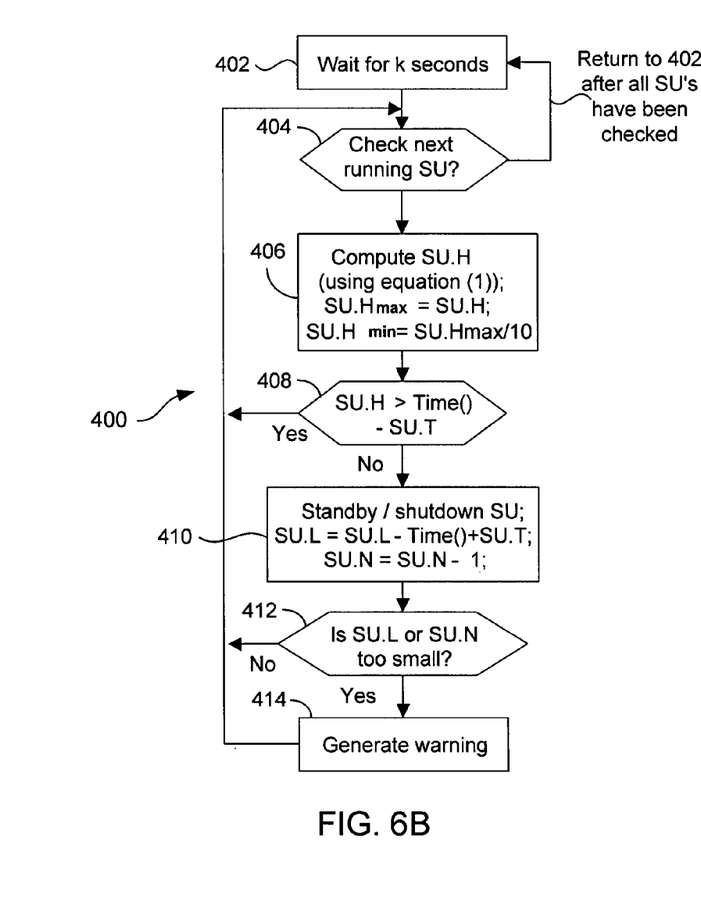
FIG. 6b is a flow diagram illustrating how the control unit of the storage system manages the storage units with an adaptive competitive algorithm to optimize disk lifetime and power consumption according to the present invention.

FIG. 6B, is a flow diagram 300 illustrating how a control unit of the archival disk-based data storage system manages the storage units with an adaptive competitive algorithm to optimize disk lifetime and power consumption according to the present invention. FIG. 6B is identical to 5B except in step 406, Hmax and Hmin are recomputed. Thus the value of SU.H remains within the limits of these two thresholds. Otherwise the remainder of the flow chart for 408–414 are identical to 208–214 of FIG. 5B.

The present invention thus describes several approaches to extend the lifetime of disk storage in a storage unit 26. The first approach keeps track of and uses the remaining spin life of a storage unit 26 to determine when to spin up and down to extend the lifetime of the disk(s) in the storage unit 26. The second approach is to use the remaining spin life and the remaining start-and-stop limit of a storage unit 26 to determine when to spin up and down to extend the lifetime of the disk(s) in the storage unit 26. The third is to use the life cost and power cost as a measure to combine spin life, start-and-stop limit, and power consumption, in order to determine when to spin up and down the storage unit 26 in order to improve both the lifetime and the power consumption of a storage unit 26. This application described two algorithms using the third approach: a competitive algorithm and an adaptive competitive algorithm. Both algorithms have the property that their results are within a factor of two of the optimal offline case.

The storage system 20 ideally needs to maintain the integrity of its data for a long period of time. This is challenging for two reasons. Disks 32 often have undetectable errors. The error rate of current disk drive technology is typically 1 in $10^{13}$ or $10^{14}$. For example with RAID, only detectable errors can be corrected. Second, detectable errors can be detected only when accessing data. Thus, there may be intervening catastrophic disk failures that can not be corrected even if they are detectable.

To detect hardware undetectable errors, the controller 30 of each storage unit 26 uses an algorithm to compute and store an error correction code (ECC) for each data block stored on its disks 32. When the data block is later accessed, the storage unit re-computes the ECC and compares it with the code stored with the data. If they are identical, it is assumed there are no errors. On the other hand if they are not identical, the controller will re-compute the ECC value yet again. If the ECC values are still different, the storage unit 26 invokes correction code to correct the error and the data is stored in a new location. Whenever data is migrated (or scrubbed) to a new location, the directory of all the archived data stored in the storage system 20 maintained by the control unit 22 is updated.

Figure 7:
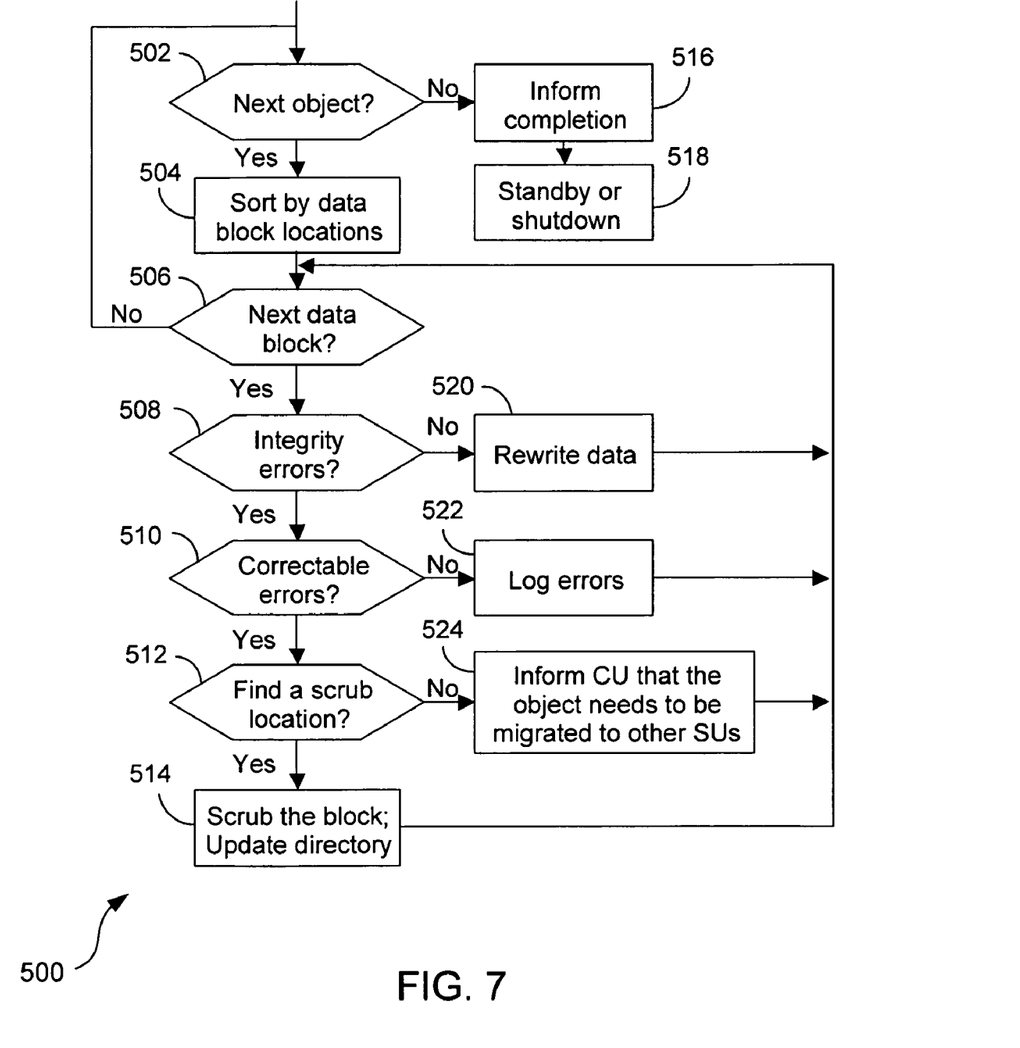
FIG. 7 is a flow diagram illustrating how the control unit of the storage system of the present invention performs data integrity checking and migration.

Referring to FIG. 7, a flow diagram 500 illustrating how the control unit 22 performs data integrity checking and migration according to the present invention is shown. The data integrity check processes one object at a time (step 502). To check data integrity efficiently, the algorithm sorts the object's data blocks by location (step 504) and then checks one data block at a time (step 506). For each block, integrity errors are identified by calculating the ECC code (step 508). If there is no error, the data block is rewritten to the same location (step 520). If there are errors, then the algorithm checks to see whether the errors are correctable (step 510). If errors are not correctable, it will log the errors and go to check the next block (522). For correctable errors, it tries to find a new location for data scrubbing (step 512). If a new location is available on the same storage unit 26, the data be scrubbed and the directory is updated. On the other hand if it a new location can not be found, the storage unit 26 informs the control unit 22 that this object needs to be migrate to another storage unit 26 (step 524). If a new location is found, the data is migrated to the new storage unit 26 and the directory in the control unit 22 is updated before the next block is checked (step 514). When the data integrity check process completes, the control unit 22 is notified of the completion (step 516) and then shuts down the storage unit 26 or puts the unit into standby mode (step 518).

According to one embodiment, the control unit 22 schedules the storage units 26 to perform data integrity checks of its data once every time period P. Since data integrity checks will consume the spin lifetime and power of disks 32, P should be chosen based on a desired percentage p of the total spin lifetime and the number of start and stops. Accordingly, P may be set based on the following equation:

$$P = \frac{1}{p} \max\left\{\frac{S}{BW}, \frac{L}{N}\right\} \quad (2)$$

where S is the size of the storage unit and BW is the bandwidth of checking data integrity.

Although the foregoing invention has been described in some detail for purposes of clarity of understanding, it will be apparent that certain changes and modifications may be practiced within the scope of the appended claims. For instance, the storage system 20 can be designed without a power controller 28. In such embodiments, the control unit 22 would not be capable powering off the storage units 26. Power would be conserved only by placing the storage units into standby mode. Typically the decision to either power off or place a disk into standby mode is a trade off between lower power consumption versus response time. If power consumption is more important than response time, the disks 32 should be powered off. If response time is more important, then the disks should be placed into a standby mode. The controller 30 can be a computer used to control the storage unit 26. Therefore, the described embodiments should be taken as illustrative and not restrictive, and the invention should not be limited to the details given herein but should be defined by the following claims and their full scope of equivalents.

We claim:

1. An archival storage apparatus for use in a hierarchical storage infrastructure having a primary memory, the archival storage apparatus comprising:

an archival storage unit configured to store archival data, the archival storage unit including at least one spindle of disks configured to magnetically store archival data;

an interconnect configured to couple the archival storage system to the primary storage system; and a control unit configured to process requests over the interconnect to either archive data stored in the primary memory in the archival storage unit or retrieve data from the archival storage unit and provide the retrieved data to the primary storare unit, the control unit further configured to extend the lifetime of the at least one spindle of disks by selectively controlling the at least one spindle of disks using an algorithm intended to extend the longevity of the at least one spindle of disks, the algorithm relying on the following parameters:

the cost of the archival storage unit;

the cost per watt to operate the archival storage unit;

the spin lifetime of the at least one spindle of disks;

the total number of start-and-stops of the at least one spindle of disks;

the time taken to spin in the at least one spindle of disks;
the number of watts consumed for read or write operation to the archival storage unit; and
the number of watts consumed for a spin up of the at least one spindle of disks.

2. The apparatus of claim 1, further comprising a power controller coupled to the control unit and the archival storage unit, the control unit further configured to generate commands to the power controller to selectively power on and off the archival storage unit.

3. The apparatus of claim 2, wherein the control unit issues an on/off command signal and an ID signal corrsponding to the archival storage unit to the power controller to selectively power on and off the archival storage unit through the power controller.

4. The apparatus of claim 1, wherein the archival storage unit further includes a controller configured as a slave in a master-slave arrangement with respect to the control unit.

5. The apparatus of claim 1, wherein the archival storage unit is configured to perform one or more of the following tasks in response to commands from the control unit: shut down or power up the archival storage unit; enter running or standby modes; spin up or spin down the at least one spindle of disks; and periodically perform data integrity checks of the archival data stored on the archival storage unit.

6. The apparatus of claim 1, wherein the least one spindle of disks is arranged in a RAID configuration.

7. The apparatus of claim 1, wherein the at least one spindle of disks are configured as individual disks in either a logical or physical arrangement.

8. The apparatus of claim 1, wherein the control unit maintains a directory of the data archived on the archival storage unit, the directory including a map of the archived data stored in data blocks on the archival storage unit.

9. The apparatus of claim 8, wherein the directory is updated whenever data is archived or retrieved from the archival storage unit.

10. The apparatus of claim 1, wherein the control unit is configured to issue commands to the archival storage unit, the commands including at least one of the following: commands to shut down or power up the archival storage unit; commands to cause the archival storage unit to enter a running mode or a standby mode; commands to cause the archival storage unit to spin up or spin down the at least one spindle of disks; and commands to instruct the archival storage unit to perform a data integrity check of the archival data stored on the archival storage unit.

11. The apparatus of claim 1, further comprising a plurality of the archival storage units, each configured to store archival data on one or more spindles of disks respectively, the control unit further configured to generate commands to the plurality of archival storage units to cause the plurality of archival storage units to selectively shut down or power up, enter run mode or standby mode, cause the spindles to spin up or down, and to perform data integrity checks.

12. The apparatus of claim 1, further comprising a plurality of the archival storage units, each configured to store archival data on one or more spindles of disks, the control unit further configured to update a directory map of the archival data stored on each of the plurality of archival storage units each time data is archived or retrieved from one of the plurality of archival storage units.

13. The apparatus of claim 1, wherein the control unit is further configured to process archival and retrieval requests from the primary archival storage system of an information infrastructure, the information infrastructure further including a server cluster coupled to the primary storage unit and further configured to be coupled to one or more clients through a network.

14. The apparatus of claim 1, wherein the control unit manages access to a plurality of the archival storage units by:
receiving a request;
identifying the appropriate archival storage unit among the plurality of archival storage units to handle the request;
determining if the appropriate archival storage unit is on; and either:
sending the request to the appropriate archival storage unit if the appropriate archival storage unit is on; or
waking up or powering on the appropriate archival storage unit if the appropriate archival storage unit is in sleep mode or is powered off before sending the request to the appropriate archival storage unit;
processing the request at the appropriate archival storage unit; and
repeating the above for each subsequent request received by the control unit.

15. The apparatus of claim 14, wherein either:
if the appropriate archival storage unit is on, comparing a current value of SU.H which is substantially equal to the duration of time where the life cost and power cost of an idle spinning disk approximately equals the life cost and power cost of a disk spin up and spin down cycle of the appropriate archival storage unit to a predetermined value of Hmax and incrementing the value of SU.H if SU.H is less than Hmax; or
if the appropriate archival storage unit is off or is in sleep mode, comparing the current value of SU.H to a second predetermined value of Hmin and decrementing SU.H if SU.H is greater than Hmin.

16. The apparatus of claim 1, wherein the control unit manages access to a plurality of the archival storage units by:
defining a threshold H for the archival storage unit equal to the duration of time where the life cost and power cost of an idle spinning disk approximately equals the life cost and power cost of a disk spin up and spin down cycle;
initializing a parameter L which is the remaining spin lifetime of the archival storage unit;
initializing a parameter N which equals the remaining number of starts and stops of the archival storage unit;
noting the last time-stamp T of the previous request;
receiving a new request;
identiffIng the appropriate archival storage unit to handle the new request determining if the appropriate archival storage unit is on; and either
sending the request to the appropriate archival storage unit if the appropriate archival storage unit is on or is in wake up mode; or
turning on or waking up the appropriate archival storage unit if the appropriate archival storage unit is in sleep mode or is powered off before sending the request to the appropriate archival storage unit;
processing the request on the appropriate archival storage unit;
updating the parameters of L and T; and
waiting for the next request.

17. The apparatus of claim 16, wherein the value of H is determined by:

$$H = \left(\frac{C_{SU}}{N} + C_W \times W_{Up} \times T_{Up}\right) \Big/ \left(\frac{C_{SU}}{L} + C_W \times W_{RW}\right) \quad (1)$$

where:
$C_{SU}$: the cost of the archival storage unit
$C_W$: the cost per watt
L: the spin lifetime
N: the total number of start-and-stops
$T_{Up}$: the time taken to spinup
$W_{RW}$: the number of watts consumed for read or write operations, and
$W_{Up}$: the number of watts consumed for a spin up.

18. The apparatus of claim 1 wherein the control unit manages the power consumption and disk lifetime of a plurality of the archival storage units by:
sequencing through each of the plurality of archival storage units to determine which of the plurality of archival storage units are running, and for each archival storage unit identified as running:
computing an SU.H value for the running archival storage unit, the SU.H value being defined as substantially equal to the duration of time where the life cost and power cost of an idle spinning disk approximately equals the life cost and power cost of a disk spin up and spin down cycle of the archival storage unit; and
comparing the SU.H value for the running archival storage unit to the elapsed time since the previous request to that running archival storage unit, and either
powering off or placing the running archival storage unit in standby mode if the elapsed time exceeds the SH.U value; or
returning to sequencing through each of the plurality of archival storage units if the elapsed time is less than the SH.U value.

19. The apparatus of claim 18, further generating a warning if the spinning lifetime or the remaining number of start-and-stops of the archival storage unit powered off or placed in standby mode falls below a predetermined threshold.

20. The apparatus of claim 1, wherein the control unit manages the data integrity of a plurality of archival storage units by:
identifying a data block stored at a first location on one of the plurality of archival storage units;
calculating an error correction code for the identified block and comparing it to a previous error correction code calculated when the data was first stored on the identified data block at the first location; and either:
re-writing the data block to the first location if the calculated error correction code is the same as the previous error correction code; or
determining if the error is correctable if the calculated error correction code is different than the previous error correction code; and
migrating the data stored on the identified data block to a second location on one of the plurality of archival storage units if the error is correctable.

21. The apparatus of claim 19, further comprising logging the error if it is determined that the error is not correctable.

22. The apparatus of claim 19, further comprising repeating the above for all of the data blocks stored on the plurality of archival storage units.

23. The apparatus of claim 19 wherein the data integrity of the plurality of archival storage units is checked with a periodicity P where:

$$P = \frac{1}{p}\max\left(\frac{S}{BW}, \frac{L}{N}\right)$$

and S is the size of the archival storage unit and BW is the bandwidth of checking data integrity, N is the remaining number of starts-and-stops, L is the remaining spin lifetime and p is a desired percentage of the total lifetime and number of start and stops of the disks of the archival storage units.

24. The apparatus of claim 1, further comprising a data integrity checker configured to check the integrity of the data stored on the disk.

25. The apparatus of claim 24, wherein the data integrity checker checks the integrity of the data stored on the disk every period P where P is defined by $$P = \frac{1}{p}\max\left(\frac{S}{BW}, \frac{L}{N}\right),$$

where S is the size of the archival storage unit and BW is the bandwidth of the data integrity checker, N is the remaining number of starts-and-stops, L is the remaining spin lifetime, and p is a desired percentage of the total spin lifetime of the disk.

26. The apparatus of claim 24, wherein the data integrity checker checks the integrity of the data with a periodicity of P where P is determined based on one or more of the following: the remaining number of start-and-stops of the disk or the remaining spin lifetime of the disk.

27. The apparatus of claim 24, wherein the data integrity checker performs a data integrity check on the disk by:
identifying a data block stored at a first location on the disk;
calculating an error correction code for the identified data block and comparing it to a previous error correction code calculated when the data block was first stored at the first location; and either:
re-writing the data block to the first location if the calculated error correction code is the same as the previous error correction code; or
determining if the error is correctable if the calculated error correction code is different than the previous error correction code; and
migrating the data block a second location if the error is correctable; and
repeating the aforementioned for each data block stored on the disk.

28. The apparatus of claim 27, wherein the second location is located on the disk.

29. The apparatus of claim 27, wherein the second location is located on another disk.

30. The apparatus of claim 24, wherein the data integrity checker is further configured to periodically check the integrity of the data stored on a plurality of the disks.

31. The apparatus of claim 1 further comprising a managing unit configured to manage the operation of the disk to extend the lifetime of the disk, the managing unit being configured to estimate the remaining spin lifetime of the disk and to determine when to spin up or spin down the disk to extend its lifetime based on the estimated remaining spin lifetime of the disk.

32. The apparatus of claim 31, wherein the managing unit is further configured to estimate the remaining start and stop limit of the disk and determine when to spin up or spin down the disk to extend the lifetime of the disk based on the estimated remaining spin lifetime and the estimated remaining start and stop limit of the disk.

33. The apparatus of claim 32, wherein the managing unit determines when to spin up or spin down the disk further by:
   computing a threshold value for the disk, the threshold value being defined as substantially equal to the duration of time where the life cost of the disk spinning idle approximately equals the life cost of a spin up and spin down cycle of the disk;
   comparing the threshold value for the disk when it is running to the elapsed time since the previous request to the disk, and
   powering off or placing the disk into a standby mode if the elapsed time exceed the threshold value.

34. The apparatus of claim 33, wherein the computing the threshold value further includes the consideration of the power cost of having the disk run idle versus the power cost of having the disk spin up and spin down.

35. The apparatus of claim 34, wherein the threshold value is adjustable.

36. The apparatus of claim 33, wherein the managing unit is further configured to generate a warning if either the remaining spin lifetime falls below a first minimum value or remaining start and stop limit falls below a second minimum value.

37. A method comprising:
   providing an archival data storage system having an archival storage disk in a memory hierarchy having a primary storage, the archival data storage system configured to periodically archive data stored in the primary memory and to periodically provide archived data to the primary storage unit;
   providing a data integrity checker within the archival storage system to check the integrity of the data stored on the archival storage disk; and
   configuring the data integrity checker to check the integrity of the data stored on the archival storage disk; and
   providing a control to control the archival storage unit, the control unit further configured to extend the lifetime of the archival storage disk by selectively controlling the archival storage disk using an algorithm intended to extend the longevity of the archival storage disk, the algorithm relying on the following parameters:
   the cost of the archival storage unit;
   the cost per watt to operate the archival storage unit;
   the spin lifetime of the archival storage disk;
   the total number of start-and-stops of the archival storage disk;
   the time taken to spin up the archival storage disk;
   the number of watts consumed for a read or write operation to the archival storage unit; and
   the number of watts consumed for a spin up of the archival storage disk.

38. The method of claim 37, wherein the data integrity checker checks the integrity of the data every period P where period P is defined by $$P = \frac{1}{p}\max\left\{\frac{S}{BW}, \frac{L}{N}\right\},$$

where S is the size of the archival data system, and BW is the bandwidth of the data integrity checker, N is the remaining number of starts-and-stops, L is the remaining spin lifetime, and p is a desired percentage of the total spin lifetime of the of the archival storage disk.

39. The method of claim 37, wherein the period P is determined based on one or more of the following: the remaining number of start-and-stops of the archival storage disk or the remaining spin lifetime of the archival storage disk.

40. The method of claim 37, wherein the data integrity checker performs a data integrity check on the archival storage disk by:
   identifying a data block stored at a first location on the archival storage disk;
   calculating an error correction code for the identified data block and comparing it to a previous error correction code calculated when the data block was first stored at the first location; and either:
      re-writing the data block to the first location if the calculated error correction code is the same as the previous error correction code; or
      determining if the error is correctable if the calculated error correction code is different than the previous error correction code; and
      migrating the data block a second location if the error is correctable; and
   repeating the aforementioned for each data block stored on the storage disk.

41. The method of claim 40, wherein the second location is located on the archival storage disk.

42. The method of claim 40, wherein the second location is located on another archival storage disk.

43. The method of claim 37, further comprising:
   providing a plurality of the archival storage disks in the archival storage system; and
   configuring the data integrity checker to successively check the integrity of the data stored on the plurality of the archival storage disks.

44. A method comprising:
   providing an archival data storage system having an archival storage disk in a memory hierarchy having a primary storage, the archival data storage system configured to archive data stored in the primary memory and to provide archived data to the primary storage unit;
   providing a control unit the control unit further configured to control the archival data storage system, the control unit configured to extend the lifetime of the archival storage disk by selectively controlling the archival storage disk using an algorithm intended to extend the longevity if the archival storage disk, the algorithm relying on the following parameters:
   the cost of the archival data storage system;
   the cost per watt to operate the archival data storage system;
   the spin lifetime of the archival storage disk;
   the total number of start-and-stops of the archival storage disk;

the time taken to spin up the archival storage disk;
the number of watts consumed for read or write operation to the archival data storage system; and
the number of watts consumed for a spin up of the archival storage disk;
estimating the remaining spin lifetime of the archival storage disk in the archival data storage system using the algorithm; and
determining when to spin up or spin down the archival storage disk to extend the lifetime of the archival storage disk using the algorithm.

45. The method of claim 44 wherein the algorithm is further configured for:
estimating the remaining start and stop limit of the archival storage disk; and
determining when to spin up or spin down the archival storage disk to extend the lifetime of the archival storage disk based on the estimated remaining spin lifetime and the estimated remaining start and stop limit of the archival storage disk.

46. The method of claim 45, wherein determining when to spin up or spin down the archival storage disk further comprises:
computing a threshold value for the archival storage disk, the threshold value being defined as substantially equal to the duration of time where the life cost of the archival storage disk spinning idle approximately equals the life cost of a spin up and spin down cycle of the archival storage disk;
comparing the threshold value for the archival storage disk when it is running to the elapsed time since the previous request to the archival storage disk; and
powering off or placing the archival storage disk into a standby mode if the elapsed time exceed the threshold value.

47. The method of claim 46, wherein the computing the threshold value further includes the consideration of the power cost of having the archival storage disk run idle versus the power cost of having the archival storage disk spin up and spin down.

48. The method of claim 46, wherein the threshold value is adjustable.

49. The method of claim 45, wherein the algorithm is further configured for generating a warning if either the remaining spin lifetime of the archival storage disk falls below a first minimum value or the remaining start and stop limit of the archival storage disk falls below a second minimum value.

50. The apparatus of claim 1, wherein the interconnect comprises one of the following types of network connections: fiber channel, Ethernet, or SCSI.

* * * * *